May 2, 1939. L. C. BOYER 2,156,909
METHOD OF HANDLING STRIPS OF EXTRUDED MATERIAL
Filed July 31, 1937
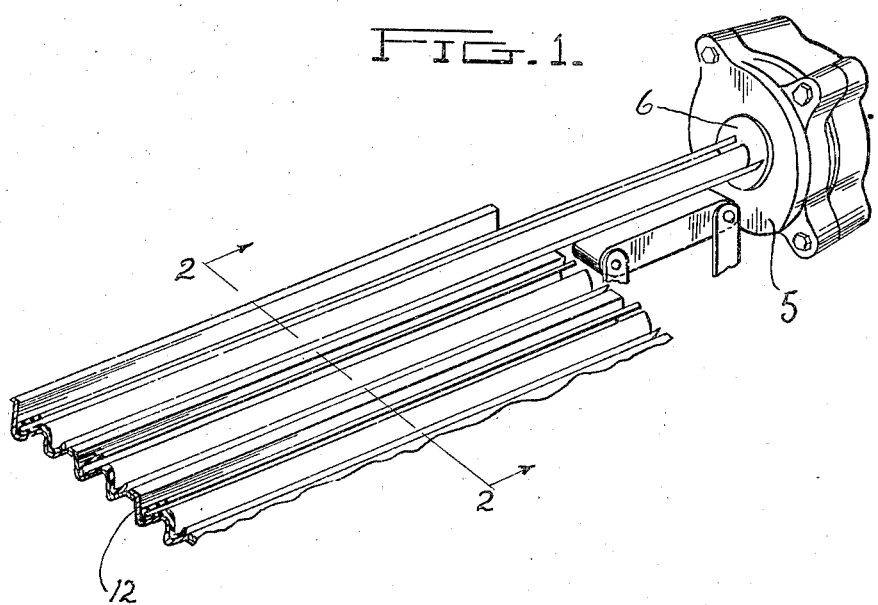
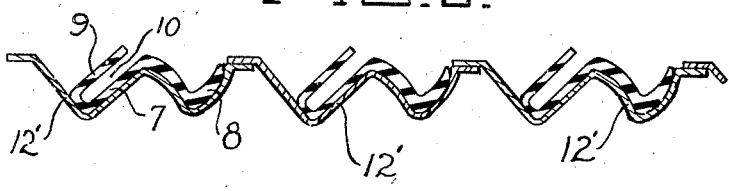
Inventor
Lester C. Boyer
By Owen & Owen
Attorneys Patented May 2, 1939

2,156,909

UNITED STATES PATENT OFFICE 2,156,909

METHOD OF HANDLING STRIPS OF EXTRUDED MATERIAL

Lester C. Boyer, Toledo, Ohio

Application July 31, 1937, Serial No. 156,702

2 Claims. (Cl. 18—53)

This invention relates to a method for handling strips of extruded rubber.

Heretofore it has been the universal practice to mold those rubber strips having a complicated cross-section in which parts of the strip lie in planes angularly disposed with respect to the planes of other parts. In this process, the uncured rubber is put into a suitably formed mold, and, by the application of heat and pressure, is formed and cured. The mold sections necessary to make strips having multiplanar cross-sections are expensive and the process requires considerable time so that the strips themselves must command a relatively high price per foot if the fabricator is to profit from his work. It has been known that strips having a U-shaped or similar cross-section could be economically made by extrusion and that this process was economical. However, so far as I am aware, prior to the present invention, it has been considered impossible to make, by extrusion, strips in which various parts were disposed in separate planes less than 90° from the horizontal for the reason that the strips sagged badly after extrusion before they could be put through the curing stage and the finished product, therefore, did not bear the desired conformation.

The primary object of the present invention is the provision of a method which will enable the fabrication, by extrusion, of strips of rubber or other plastice material having a relatively complicated cross-section.

Other objects and advantages of the invention will become apparent as the description proceeds, reference being had to the accompanying drawing, in which—

Figure 1 is a diagrammatic representation of an extrusion head and apparatus which may be used in accordance with the present invention, and Fig. 2 is a section on line 2—2 of Fig. 1.

Referring to the drawing, 5 designates an extrusion head having a die 6, the cross-section of which conforms to the cross-section of the strip which is extruded in the usual manner.

As shown in Fig. 2, the illustrated strip comprises an intermediate portion 7 of inverted V-shape from which an end part 8 extends, lying in a plane substantially at right angles to one of the arms of the intermediate V portion and, therefore, disposed in a plane inclined about 45° to the horizontal. The strip also includes an L-shaped end part 9 connected to the other arm of the intermediate V portion. It will be seen that the free leg of the portion 9 is substantially parallel to the adjacent arm of the intermediate V portion and cooperates therewith to form the strip with a U-shape edge channel 10.

A pan or trough designated 12 is made up of a plurality of similar sections 12'. Each section 12' has a plurality of ways or grooves formed therein, the sides of which are disposed in planes conforming to the planes of the intermediate part 7 and the undersides of the end portions 8 and 10. It will thus be seen that the pan 12 has its top surface formed of a series of strips, each complemental to the irregular formation of the extruded strip and that the strip is thereby supported throughout its under side against the action of gravity prior to the curing stage.

Any suitable means may be used to connect the several sections 12' of the pan together, or, if desired, these sections may be made as a unit or used individually. It has been found in practice that it is cheaper to make one set of rolls and to form a plurality of individual sections 12' and fix them together in any suitable manner, such as by welding. The strips may be made of any suitable material such as metal or hardened plastic, or if desired, of hard rubber.

The fabrication of strips having a cross-section, such as that shown in the drawing, may be done by permitting the extrusion press to force a length of the formed rubber down one of the ways until this particular way is filled. The operator then cuts the strip and moves the pan over so that the next strip of rubber will be directed into the next succeeding groove in the pan. This may be continued until the entire pan is filled after which it is taken to the curing oven for final treatment of the strips. The strips are cured on the open pan so that the top surfaces are unconfined. Obviously, after curing, the strip will be self-supporting and will maintain its desired configuration.

It will be seen that the present invention provides a simple and expedient method for preventing sagging of the extruded strip prior to curing by providing a suitable foundation for the rubber while it is in its plastic stage and incapable of supporting its angularly disposed parts.

While the invention has been disclosed in connection with a particular form of strip, it should be readily appreciated that any configuration may be made merely by changing the shape of the pan. The offset parts designated 9 in Fig. 2 do not require support in the present instance, since any sagging which may take place in these parts will not affect the finished strip.

Having thus described my invention, what I claim as new, and desire to secure by United States Letters Patent, is:

1. The method of fabricating rubber strips of comparatively thin wall formation having in cross-section a plurality of angularly disposed portions which includes, extruding the strips to substantially the finished conformation, supporting each portion of the strip against sagging throughout its length, and curing the strip while they remain so supported and with the top surface thereof exposed and unconfined.

2. The method of fabricating rubber strips of comparatively thin wall formation having in cross section a plurality of angularly disposed portions which includes extruding the strips to substantially the finished configuration onto a support having a configuration complemental to the angular under surface of the strips whereby the strips are supported against sagging, and curing the strips while they remain on said support and with the top surface thereof exposed and unconfined.

LESTER C. BOYER.